United States Patent
Tachibana et al.

(10) Patent No.: US 9,160,272 B2
(45) Date of Patent: Oct. 13, 2015

(54) CONTROL DEVICE AND CONTROL METHOD FOR PERMANENT MAGNET MOTOR

(71) Applicants: Tomoya Tachibana, Chiyoda-ku (JP); Takeshi Mori, Chiyoda-ku (JP); Mitsuharu Hashiba, Chiyoda-ku (JP); Masaya Inoue, Chiyoda-ku (JP); Moriyuki Hazeyama, Chiyoda-ku (JP)

(72) Inventors: Tomoya Tachibana, Chiyoda-ku (JP); Takeshi Mori, Chiyoda-ku (JP); Mitsuharu Hashiba, Chiyoda-ku (JP); Masaya Inoue, Chiyoda-ku (JP); Moriyuki Hazeyama, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/368,542

(22) PCT Filed: Jan. 18, 2013

(86) PCT No.: PCT/JP2013/050944
§ 371 (c)(1),
(2) Date: Jun. 25, 2014

(87) PCT Pub. No.: WO2013/108877
PCT Pub. Date: Jul. 25, 2013

(65) Prior Publication Data
US 2014/0354204 A1    Dec. 4, 2014

(30) Foreign Application Priority Data

Jan. 20, 2012 (JP) ................. 2012-009749

(51) Int. Cl.
*G05D 23/00*   (2006.01)
*H02P 29/00*   (2006.01)
(Continued)

(52) U.S. Cl.
CPC ............ *H02P 29/0066* (2013.01); *H02K 7/108* (2013.01);
(Continued)

(58) Field of Classification Search
CPC ....... G01K 7/36; H02P 29/0066; H02P 29/00; H02K 7/108
USPC ............... 318/471, 472, 473, 400.01, 400.02, 318/400.14, 400.15, 634, 641, 400.08, 318/400.12, 400.34, 400.38, 700, 701, 721, 318/714, 715, 718, 799, 800, 801, 430, 432, 318/437; 388/800, 833; 310/315, 346, 144, 310/153, 49.32, 49.28, 152, 154.21, 156.01, 310/154.32
See application file for complete search history.

(56) References Cited

U.S. PATENT DOCUMENTS 7,772,791 B2 * 8/2010 Lim et al. ................... 318/432

FOREIGN PATENT DOCUMENTS

JP    6-22583       1/1994
JP    2007-104855   4/2007
(Continued)

OTHER PUBLICATIONS

International Search Report issued Apr. 23, 2013, in PCT/JP2013/050944, filed Jan. 18, 2013.

*Primary Examiner* — Antony M Paul
(74) *Attorney, Agent, or Firm* — Oblon, McClelland, Maier & Neustadt, L.L.P.

(57) ABSTRACT

A control device for a permanent magnet motor, including: a rotor position detector configured to detect a rotating speed of a rotor of a permanent magnet motor in a state in which the permanent magnet motor is disconnected from a load by a clutch and rotates without power supply; a magnet temperature estimator configured to estimate a magnet temperature of the permanent magnet motor based on the detected rotating speed; a current compensator configured to determine a compensation amount for compensating for a current command to the permanent magnet motor based on the estimated magnet temperature; and a drive control device configured to control a power converter for driving the permanent magnet motor based on the compensation amount.

6 Claims, 9 Drawing Sheets

(51) Int. Cl.
*H02P 6/08* (2006.01)
*H02K 7/108* (2006.01)
*H02P 23/14* (2006.01)

(52) U.S. Cl.
CPC *H02P 6/08* (2013.01); *H02P 23/14* (2013.01); *B60L 2240/425* (2013.01); *Y02T 10/642* (2013.01)

(56) References Cited

FOREIGN PATENT DOCUMENTS

| | | |
|---|---|---|
| JP | 2009-261182 | 11/2009 |
| JP | 2010-124610 | 6/2010 |
| JP | 4701481 | 6/2011 |

\* cited by examiner

CONTROL DEVICE AND CONTROL METHOD FOR PERMANENT MAGNET MOTOR

TECHNICAL FIELD

The present invention relates to a control device and a control method for a permanent magnet motor including a permanent magnet, for controlling an output of the permanent magnet motor.

BACKGROUND ART

In a motor using a permanent magnet, a temperature of the permanent magnet of a rotor is raised by heat generated from windings and a core of a stator. As a result, a magnetic flux density remaining in the permanent magnet is reduced so that torque is lowered. Therefore, there is proposed a method of estimating a temperature of the permanent magnet and supplying a compensation current for compensating for the lowered torque based on the estimated temperature so as to stabilize an output (see, for example, Patent Literature 1).

However, when the compensation current is supplied, the compensation current causes an increase in amount of heat generated from the windings and the core of the stator so that the temperature of the permanent magnet is also raised. Further, if the permanent magnet is a high-temperature demagnetization magnet, when the permanent magnet is exposed to a high temperature that is equal to or higher than an operable operating temperature thereof, a coercive force is decreased, resulting in irreversible demagnetization. Therefore, it is necessary to limit a torque command so as to protect the permanent magnet when the estimated temperature of the permanent magnet becomes close to a maximum operable operating temperature.

In addition, in order to protect the permanent magnet, it is necessary to correctly estimate a temperature of the permanent magnet. In a related-art control device for a motor, a relationship among an induced voltage, a rotating speed (the number of rotations), and a temperature of a permanent magnet of a motor is determined as a map in advance. Further, in an actual operation, in a state where the motor is not supplied with power and is idling due to an external force related to an internal-combustion engine, the induced voltage and the rotating speed are detected based on outputs of a voltage sensor and a magnetic pole sensor. Then, using the detected induced voltage and rotating speed, the temperature of the permanent magnet is estimated by referring to the map determined in advance (see, for example, Patent Literature 2).

CITATION LIST

Patent Literature

[PTL 1] JP 4701481 B
[PTL 2] JP 2007-104855 A

SUMMARY OF INVENTION

Technical Problems

The above-mentioned method of estimating the magnet temperature of the permanent magnet motor described in Patent Literature 1 estimates a magnetic flux of the permanent magnet based on a temperature of the motor determined from a generation loss calculation value and a thermal resistance model, and a temperature of the motor supplied from temperature detection means, and is thus affected by ambient temperature. Therefore, there is a problem of low accuracy.

In addition, the above-mentioned control device for an internal-combustion engine described in Patent Literature 2 detects the induced voltage and the rotating speed based on outputs of the voltage sensor and the magnetic pole sensor when the motor is in the idling state due to an external force related to the internal-combustion engine, and estimates the temperature of the permanent magnet by using the detected induced voltage and rotating speed with reference to the map determined in advance. However, the permanent magnet is not disconnected from a load in the estimation and is affected by other factors than inertia of the rotor, and hence there is a problem of low accuracy.

The present invention has been made to solve the above-mentioned problems, and it is an object of the present invention to provide a control device and a control method for a permanent magnet motor, which are capable of controlling a motor without being affected by ambient temperature and inertia of a member other than the rotor.

Solution to Problems

According to one embodiment of the present invention, there is provided a control device for a permanent magnet motor, including: a rotor position detector configured to detect a rotating speed of a rotor of a permanent magnet motor in a state in which the permanent magnet motor is disconnected from a load by a clutch and rotates without power supply; a magnet temperature estimator configured to estimate a magnet temperature of the permanent magnet motor based on the detected rotating speed; a current compensator configured to determine a compensation amount for compensating for a current command to the permanent magnet motor based on the estimated magnet temperature; and a drive control device configured to control a power converter for driving the permanent magnet motor based on the compensation amount.

Advantageous Effects of Invention

According to one embodiment of the present invention, the control device for a permanent magnet motor includes: the rotor position detector configured to detect the rotating speed of the rotor of the permanent magnet motor in the state in which the permanent magnet motor is disconnected from the load by the clutch and rotates without power supply; the magnet temperature estimator configured to estimate the magnet temperature of the permanent magnet motor based on the detected rotating speed; the current compensator configured to determine the compensation amount for compensating for the current command to the permanent magnet motor based on the estimated magnet temperature; and the drive control device configured to control the power converter for driving the permanent magnet motor based on the compensation amount. Thus, the motor can be controlled without being affected by influences of ambient temperature and inertia of a member other than the rotor.

DESCRIPTION OF EMBODIMENTS

First Embodiment

Figure 1:
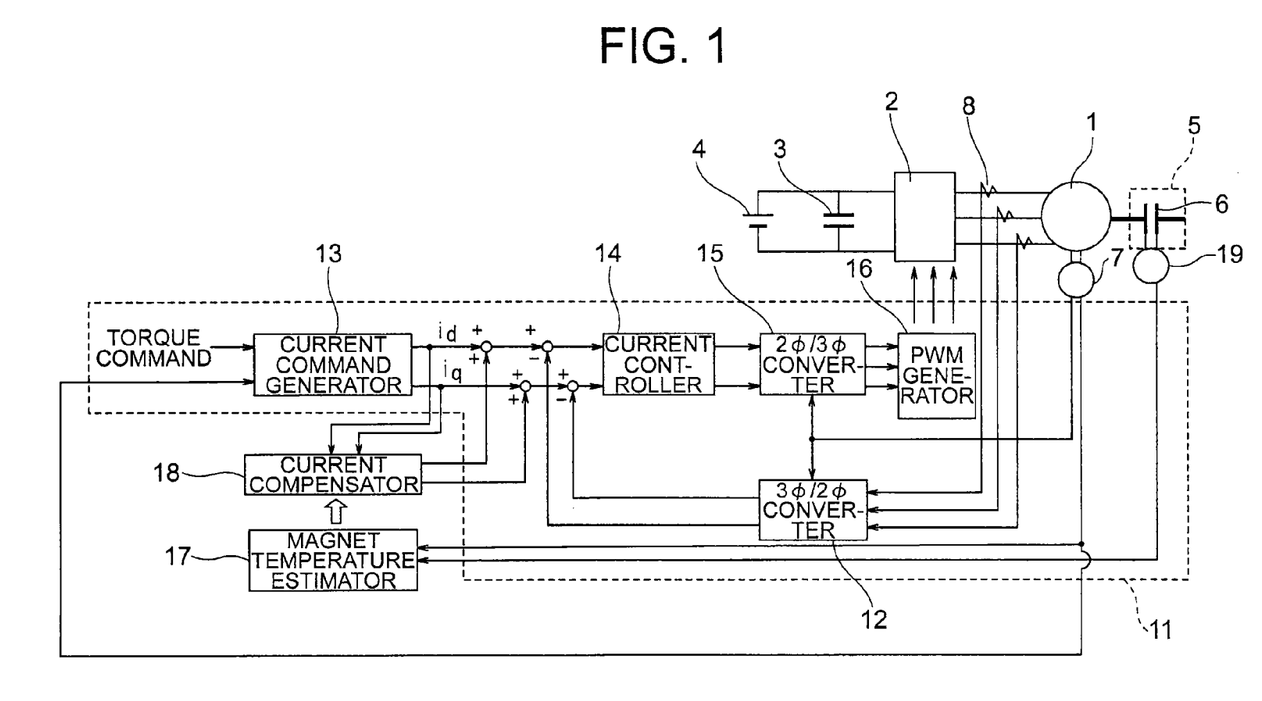
FIG. 1 is a block diagram of a control method for a permanent magnet motor according to first and second embodiments of the present invention.

FIG. 1 is a block diagram illustrating a structure of a control device for a permanent magnet motor according to a first embodiment of the present invention. The control device and a control method for a permanent magnet motor according to the present invention can be applied not only to a motor of an electric vehicle or a hybrid vehicle but also to any other types of motor drive systems.

In FIG. 1, there are illustrated a permanent magnet motor 1, a power converter 2, a capacitor 3, a DC power supply 4, a transmission 5, a clutch 6, a rotor position detector 7, a current detector 8, a drive control device 11, a 3ϕ/2ϕ converter 12, a current command generator 13, a current controller 14, a 2ϕ/3ϕ converter 15, a PWM generator 16, a magnet temperature estimator 17, a current compensator 18, and a neutral detector 19.

The control device for a permanent magnet motor according to the first embodiment of the present invention includes the rotor position detector 7, the magnet temperature estimator 17, the current compensator 18, and the drive control device 11. The rotor position detector 7 detects the rotating speed (the number of rotations) of a rotor of the permanent magnet motor 1 in a state in which the permanent magnet motor 1 is disconnected from a load by the clutch 6 so as to rotate without being supplied with a current. The magnet temperature estimator 17 estimates a magnet temperature of the permanent magnet motor 1 based on the detected rotating speed. The current compensator 18 outputs a compensation amount for compensating a current command to the permanent magnet motor 1 based on the estimated magnet temperature. The drive control device 11 controls the power converter 2, which drives the permanent magnet motor 1, based on the compensation amount.

As illustrated in FIG. 1, the permanent magnet motor 1 is supplied with power with use of the power converter 2 for performing DC/AC conversion, so as to be driven. The power converter 2 is connected to the DC power supply 4 via the capacitor 3 for smoothing a voltage. An output shaft of the permanent magnet motor 1 is connected to the transmission 5 including the clutch 6. The permanent magnet motor 1 is connected directly to the rotor position detector 7. The current detector 8 is connected between the permanent magnet motor 1 and the power converter 2. The drive control device 11 is supplied with an output signal of the rotor position detector 7 and three-phase AC current values detected by the current detector 8. The drive control device 11 includes the 3ϕ/2ϕ converter 12, the current command generator 13, the current controller 14, the 2ϕ/3ϕ converter 15, and the PWM generator 16. The magnet temperature estimator 17 is supplied with the output signal of the rotor position detector 7 and an output signal of the neutral detector 19 so that a magnet temperature is estimated. The current compensator 18 is supplied with the magnet temperature estimated by the magnet temperature estimator 17 and the current command to the permanent magnet motor 1 from the current command generator 13, and outputs the compensation amount for compensating current command values (id, iq) to the permanent magnet motor 1 based on the magnet temperature. The drive control device 11 compensates the current command value output from the current command generator 13 by the compensation amount, and generates a PWM signal for driving the power converter 2 by the compensated current command value. In this way, the drive control device 11, the magnet temperature estimator 17, and the current compensator 18 control the permanent magnet motor 1.

In the following, the structural elements of FIG. 1 are described.

The permanent magnet motor 1 includes a three-phase AC motor using a rare earth magnet such as neodymium for the permanent magnet of the rotor. Further, the permanent magnet may be another magnet such as a samarium cobalt magnet or a ferrite magnet.

The power converter 2 is an inverter, for example, including six power switching elements (such as IGBT) and diodes connected in parallel to the power switching elements. When the power converter 2 is supplied with a DC voltage from the smoothing capacitor 3, the power converter 2 converts the DC voltage into an AC voltage based on an output signal from the PWM generator 16 so as to drive the permanent magnet motor 1 as an AC motor.

The capacitor 3 includes an electrolytic capacitor or a ceramic capacitor, and smoothes the DC voltage supplied from the DC power supply 4 so as to supply the smoothed DC voltage to the power converter 2.

The DC power supply 4 includes a secondary battery such as a lead storage battery, a nickel hydride battery, or a lithium ion battery.

The transmission 5 includes the clutch 6 and a multi-stage gear of two or more steps. When changing speed, the transmission 5 disconnects driving power between the permanent magnet motor 1 and the driving side of the vehicle by the clutch 6 and changes the speed.

As the rotor position detector 7, a resolver or an encoder is used. The rotor position detector 7 is coupled to a rotation shaft of the permanent magnet motor 1. The rotor position detector 7 outputs rotation angle information to the 3φ/2φ converter 12 and the 2φ/3φ converter 15 based on a rotor position of the permanent magnet motor 1. In addition, the rotor position detector 7 outputs speed information (rotating speed) to the current command generator 13 and the magnet temperature estimator 17 based on the rotor position of the permanent magnet motor 1.

The current detector 8 detects the three-phase AC current flowing in the permanent magnet motor 1 and the power converter 2, and supplies its output signal to the 3φ/2φ converter 12.

The drive control device 11 includes the 3φ/2φ converter 12, the current command generator 13, the current controller 14, the 2φ/3φ converter 15, and the PWM generator 16 as described above, and generates the PWM signal for driving the power converter 2.

The 3φ/2φ converter 12 converts the three-phase AC current detected by the current detector 8 into two-axis currents (d-axis current and q-axis current) based on the rotation angle information from the rotor position detector 7.

The current command generator 13 generates two-axis current command values (id and iq) based on the speed information from the rotor position detector 7 and a torque command value.

The current controller 14 performs a PI control based on differences between two-axis current values output from the 3φ/2φ converter 12 and the two-axis current command values generated by the current command generator 13 and compensated by the current compensator 18.

The 2φ/3φ converter 15 converts a signal from the current controller 14 into three-phase voltage command values based on the rotation angle information from the rotor position detector 7 and outputs the three-phase voltage command values to the PWM generator 16.

The PWM generator 16 is supplied with the three-phase voltage command values from the 2φ/3φ converter 15 and generates the PWM signal for driving the power converter 2.

The magnet temperature estimator 17 stores magnet temperature information (hereinafter referred to as first magnet temperature information) in advance. The first magnet temperature information is determined in advance as a map (first magnet temperature map) of a relationship among the rotating speed of the rotor, a sum of an iron loss and a mechanical loss consumed in a predetermined time (Δt), and the magnet temperature. The magnet temperature estimator 17 calculates the sum of the iron loss and the mechanical loss of the rotor consumed in the predetermined time (Δt) based on a decreasing degree of the rotating speed (rotation gradient) in the predetermined time (Δt) and inertia of the rotor. After that, when the neutral detector 19 detects that the permanent magnet motor 1 is in a neutral state, the magnet temperature estimator 17 estimates the magnet temperature by referring to the first magnet temperature map based on the speed information (rotating speed) of the rotor detected by the rotor position detector 7 and the calculated sum of the iron loss and the mechanical loss. The magnet temperature estimator 17 outputs the estimated magnet temperature to the current compensator 18.

The current compensator 18 determines in advance a relationship between the magnet temperature and the compensation amount for compensating the current command values id and iq, and stores the relationship as a temperature-compensation amount map. The current compensator 18 refers to the temperature-compensation amount map, and extracts a compensation amount for compensating for the current command values (id and iq) for the permanent magnet motor 1 from the temperature-compensation amount map based on the magnet temperature estimated by the magnet temperature estimator 17. In addition, when the permanent magnet temperature of the permanent magnet motor 1 exceeds an operable operating temperature limit thereof, the current compensator 18 protects the permanent magnet so that the magnet does not cause irreversible demagnetization.

The neutral detector 19 detects whether or not the driving power between the output shaft of the permanent magnet motor 1 and a wheel shaft is disconnected by the clutch 6, and outputs the detection result to the magnet temperature estimator 17. As a detection method, two inputs (the motor side and the driving power side) are provided to the neutral detector 19 as illustrated in FIG. 1, and, for example, a difference between the rotating speeds thereof (the motor side and the driving power side) is determined so as to perform the detection based on the difference.

Figure 2:
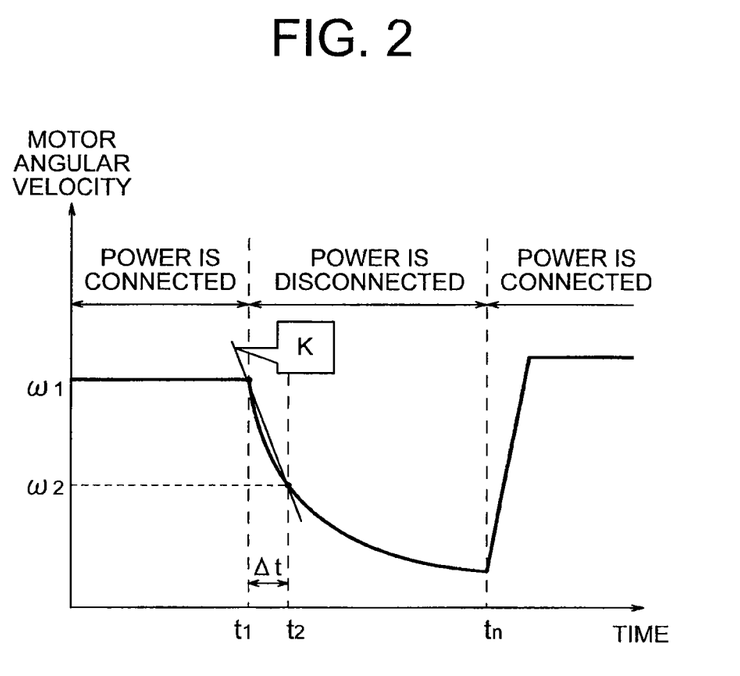
FIG. 2 is a graph showing a variation in motor revolution number at the time of changing speed according to the first and second embodiments of the present invention.

FIG. 2 is a graph showing a variation in motor revolution number in a period during which driving power is disconnected by the clutch 6 and connected again at the time of changing speed according to the first embodiment of the present invention. The horizontal axis indicates time, and the vertical axis indicates the motor rotating speed (motor angular velocity). A time point when the clutch 6 disconnects the driving power is denoted by $t_1$, and a time point when the driving power is connected again is denoted by $t_n$. In addition, a time point when the predetermined time Δt has lapsed from the time point $t_1$ is denoted by $t_2$. When the clutch 6 disconnects the driving power at the time point $t_1$ for changing speed, the permanent magnet motor 1 is disconnected from the wheel shaft and idles without power supply from the power converter 2. This state is referred to as free run in the following description. Rotational kinetic energy K of the permanent magnet motor 1 is decreased by the mechanical loss and the iron loss. The mechanical loss is a windage loss and a loss of bearing or the like, and has no relationship with temperature. On the other hand, the iron loss is an energy loss consumed in an electromagnetic steel sheet and is determined in relation to a magnetic flux density of the permanent magnet and a frequency. The magnetic flux density of the permanent magnet changes substantially linearly due to a variation in temperature. For instance, the change rate is −0.04 [%/K] for a samarium cobalt magnet, −0.1 [%/K] for a neodymium magnet, and −0.18 [%/K] for a ferrite magnet. Therefore, when the magnetic flux of the permanent magnet is decreased by an increase in temperature, the iron loss is also decreased. In the first embodiment, in the free run state, attention is paid on the iron loss that decreases along with an increase in temperature. The iron loss and the mechanical loss are determined based on a decreasing degree of the rotating speed, and the magnet temperature is estimated based on the values. Then, the power converter is controlled in accordance with the magnetic flux of the magnet that changes along with the temperature.

Figure 3:
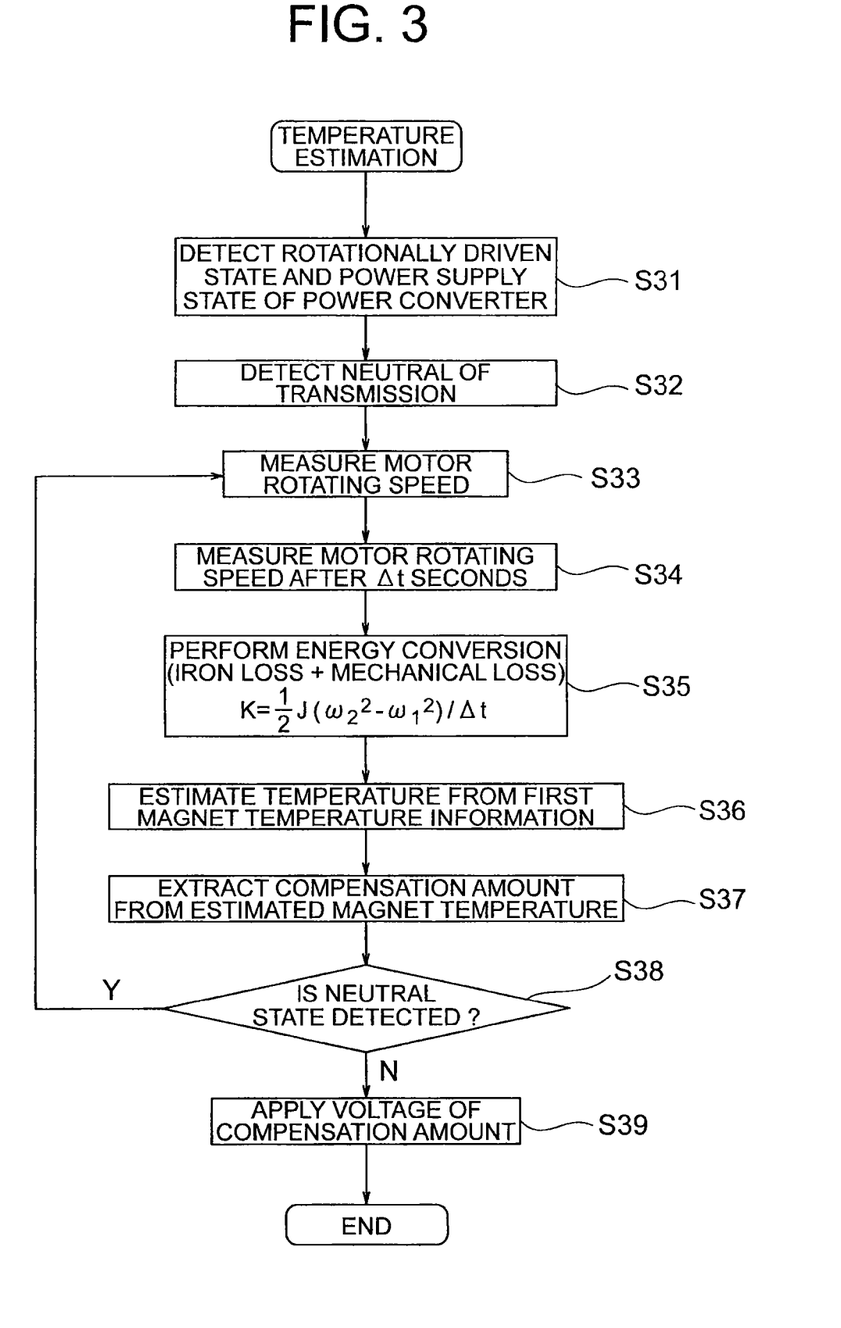
FIG. 3 is a flowchart illustrating a process flow of a control device and the control method for a permanent magnet motor according to the first embodiment of the present invention.

FIG. 3 is a flowchart illustrating a process flow of the control device for a permanent magnet motor according to the first embodiment of the present invention and is adapted to a case when the vehicle changes speed. As illustrated in FIG. 3, when the magnet temperature estimator 17 starts to estimate the temperature, the rotor position detector 7 detects the speed information of the permanent magnet motor 1 (rotating speed of the rotor), and the current detector 8 detects the power supply state from the power converter 2 to the permanent magnet motor 1 (Step S31). As a result of the detection, when the permanent magnet motor 1 is rotating without power supply, the process proceeds to Step S32. On the other hand, when the vehicle is stopped and hence the permanent magnet motor 1 is not driven, or when the power is supplied, the estimation of the magnet temperature is not performed, and the process is finished. In Step S32, the neutral detector 19 detects that the permanent magnet motor 1 is in the neutral state of being disconnected from the load by the clutch 6 (Step S32). When the neutral state is detected, the rotor position detector 7 measures the rotating speed (angular velocity) of the permanent magnet motor 1 (Step S33). Next, after Δt seconds have elapsed from the time point when the rotating speed is measured in Step S33, the rotating speed (angular velocity) of the permanent magnet motor 1 is measured again by the rotor position detector 7 (Step S34). The time Δt is a very short period of time, and needs to be appropriately adjusted and set in accordance with a resolution of the rotor position detector V. Next, the magnet temperature estimator 17 subtracts the rotating speed measured in Step S34 from the rotating speed measured in Step S33 so as to determine the decreasing degree of the rotating speed (rotation gradient) between Step S33 and Step S34, and performs energy conversion based on the decreasing degree of the rotating speed and the inertia of the rotor so as to calculate a rotational kinetic energy difference K (Step S35). The rotational kinetic energy difference K is calculated by the following expression (1) when the inertia of the rotor is represented by J, and angular velocities in Step S33 and Step S34 are represented by ω1 and ω2, respectively.

[Math. 1]

$$K = \frac{1}{2}J(\omega_2^2 - \omega_1^2)/\Delta t \quad (1)$$

The rotational kinetic energy difference K can be regarded as the sum of the mechanical loss and the iron loss consumed in the period between Step S33 and Step S34. Therefore, the magnet temperature estimator 17 calculates the sum of the iron loss and the mechanical loss (iron loss+mechanical loss) by the above expression (1), and extracts the estimated temperature of the magnet from the first magnet temperature map based on the calculated sum of the iron loss and the mechanical loss and the rotating speed of the permanent magnet motor 1 measured by the rotor position detector 7 (Step S36). Note that, the method of extracting the magnet temperature includes determining the relationship among the rotating speed of the permanent magnet motor 1, the sum of the iron loss and the mechanical loss, and the magnet temperature (hereinafter referred to as first magnet temperature information) in advance, storing a map of the relationship as the first magnet temperature map in the magnet temperature estimator 17, and extracting the magnet temperature from the first magnet temperature map.

Figure 4:
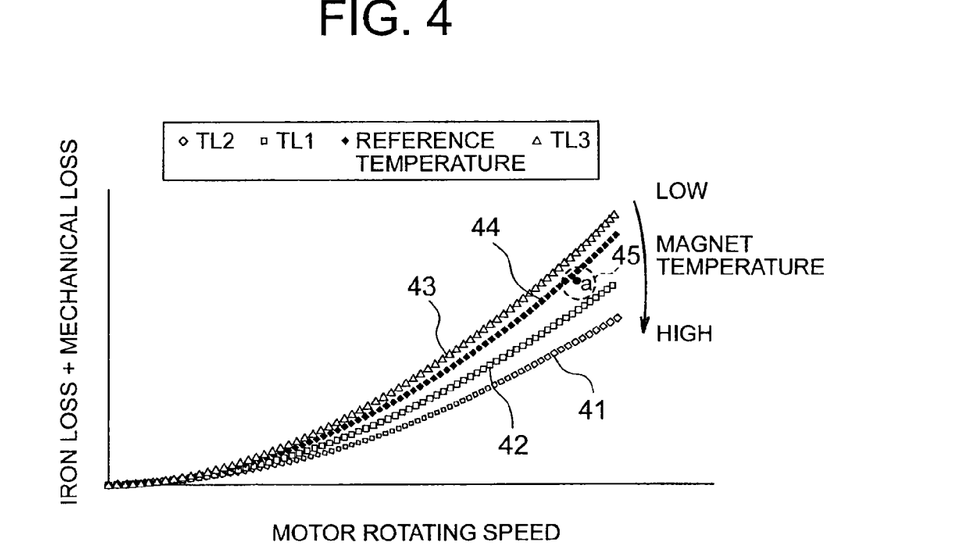
FIG. 4 is a graph showing a relationship between the motor revolution number and a sum of an iron loss and a mechanical loss at each temperature according to the first embodiment of the present invention.

FIG. 4 shows the first magnet temperature information (first magnet temperature map), in which the horizontal axis indicates the rotating speed of the permanent magnet motor 1, and the vertical axis indicates the sum of the iron loss and the mechanical loss (iron loss+mechanical loss). FIG. 4 shows a relationship between the rotating speed of the permanent magnet motor 1 and the sum of the iron loss and the mechanical loss for each magnet temperature. The magnet temperatures are TL3 (denoted by 43), a reference temperature (denoted by 44), TL1 (denoted by 42), and TL2 (denoted by 41) in an ascending order. In other words, TL3 (denoted by 43) is the lowest magnet temperature, and TL2 (denoted by 41) is the highest magnet temperature. In each magnet temperature, the sum of the iron loss and the mechanical loss (iron loss+mechanical loss) increases with respect to the increase of the rotating speed. At the same rotating speed, along with an increase in magnet temperature, the magnetic flux density of the permanent magnet is decreased, and therefore the sum of the iron loss and the mechanical loss (iron loss+mechanical loss) is decreased. Here, the reference temperature is a normal temperature of 20° C. The magnet temperature TL2 (denoted by 41) is an operable operating temperature limit when a high-temperature demagnetization magnet is used. The magnet temperature TL3 (denoted by 43) is an operable operating temperature limit when a low-temperature demagnetization magnet is used. The high-temperature demagnetization magnet is a neodymium magnet or a samarium cobalt magnet, which causes the irreversible demagnetization in which, once the temperature becomes equal to or higher than the operable operating temperature limit TL2 (denoted by 41), the magnetic flux cannot recover even after returning to the normal temperature. On the other hand, the low-temperature demagnetization magnet is a ferrite magnet, which causes the irreversible demagnetization in which, once the temperature becomes equal to or lower than the operable operating temperature limit TL3 (denoted by 43), the magnetic flux cannot recover even after returning to the normal temperature. The operable operating temperature limit is determined by a type of the magnet and a permeance coefficient of the magnet. In addition, the magnet temperature TL1 (denoted by 42) is a set temperature for determining to change from control for compensating for a decrease in magnetic flux to control for preventing the irreversible demagnetization.

Figure 5:
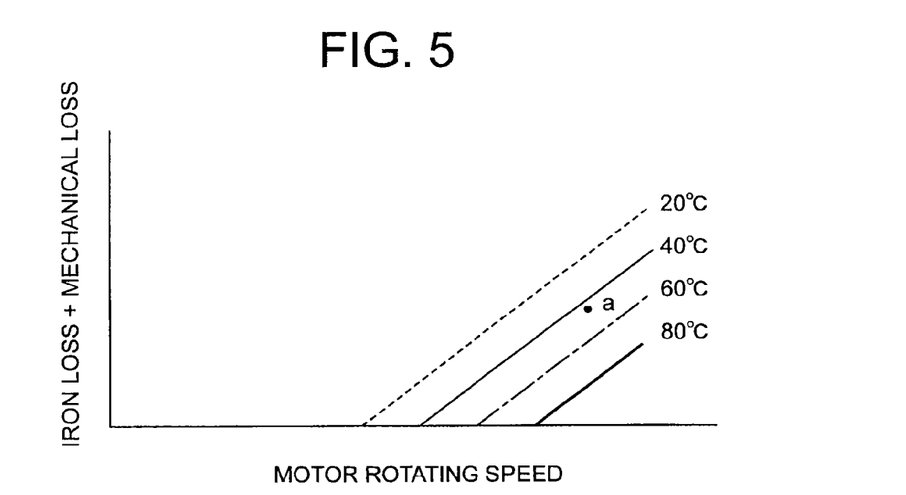
FIG. 5 is an enlarged view of a dotted line portion in FIG. 4 according to the first embodiment of the present invention.

FIG. 5 shows an enlarged view of a part within a dotted line 45 of FIG. 4 and shows relationships between the rotating speed and the sum of the iron loss and the mechanical loss (iron loss+mechanical loss) at magnet temperatures of 20° C., 40° C., 60° C., and 80° C. Here, when a value of the sum of the iron loss and the mechanical loss obtained by the calculation in Step S35 is plotted at a point "a", the magnet temperature is higher than 40° C. and lower than 60° C. In this way, the magnet temperature estimator 17 can estimate a range of the magnet temperature by referring to the calculated sum of the iron loss and the mechanical loss (iron loss plus mechanical loss) and the first magnet temperature information (Step S36). In addition, a temperature interval of the first magnet temperature information held by the magnet temperature estimator 17 is set to 20° C. in the example shown in FIG. 5, but this example is not a limitation. When the temperature interval is set to be small, the resolution of estimating the magnet temperature can be improved more. Therefore, it is possible to appropriately set the temperature interval.

Figure 6A:
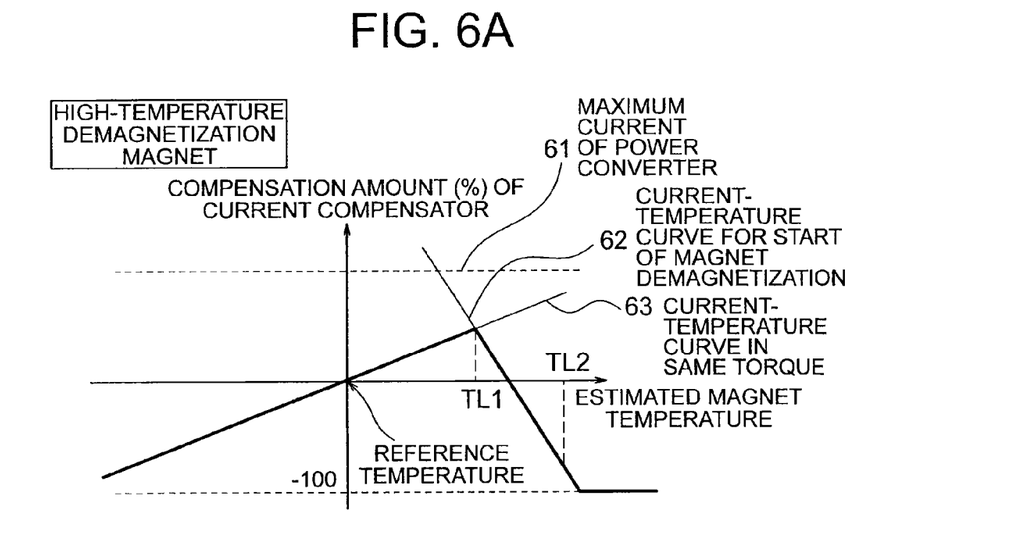
FIG. 6A is a graph showing a relationship between an estimated temperature of the magnet and a current compensation amount according to the first and second embodiments of the present invention.
Figure 6B:
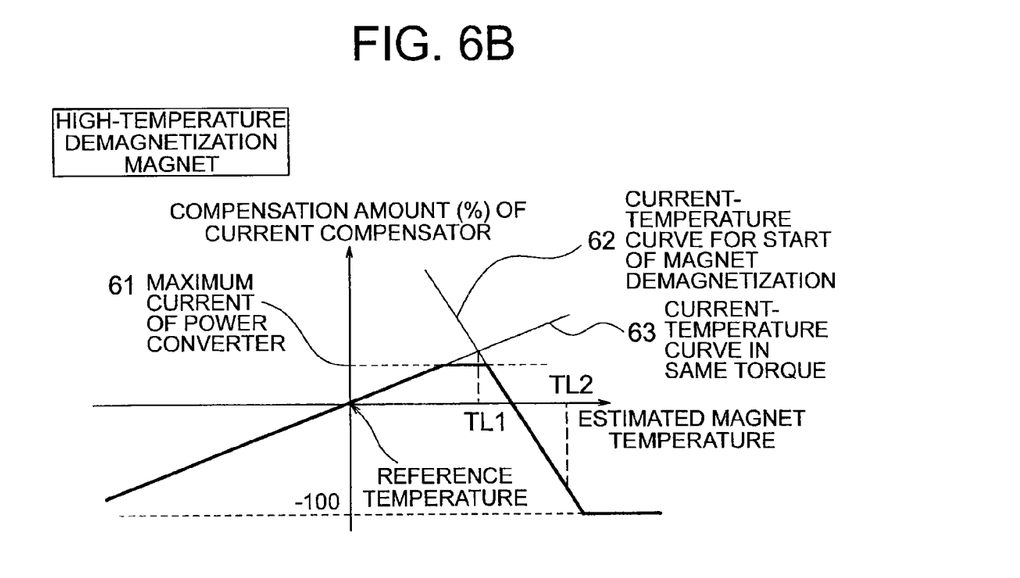
FIG. 6B is a graph showing a relationship between the estimated temperature of the magnet and the current compensation amount according to the first and second embodiments of the present invention.
Figure 6C:
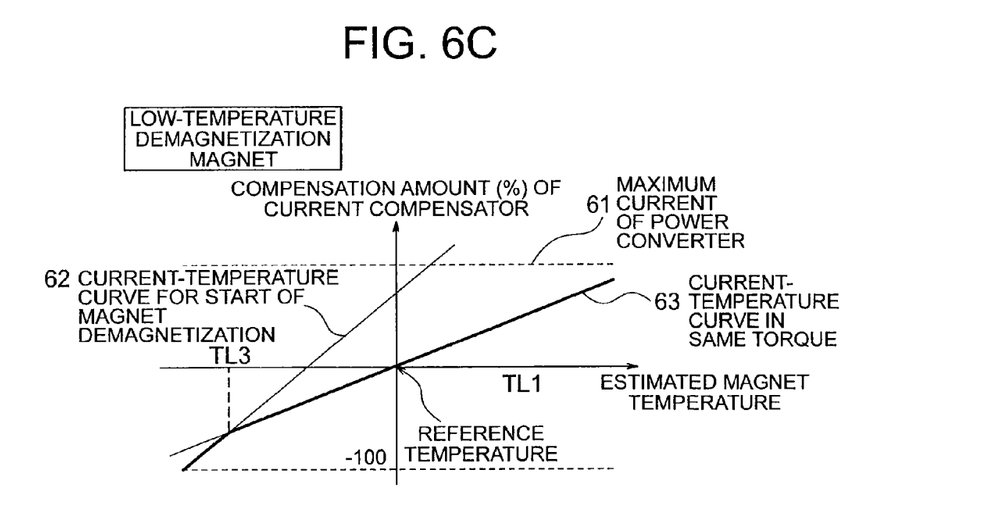
FIG. 6C is a graph showing a relationship between the estimated temperature of the magnet and the current compensation amount according to the first and second embodiments of the present invention.
Figure 6D:
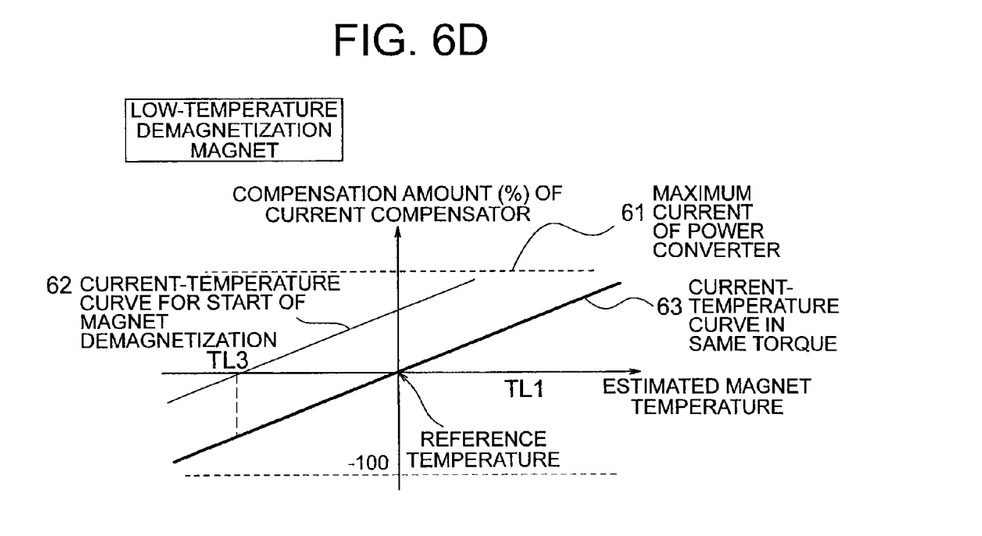
FIG. 6D is a graph showing a relationship between the estimated temperature of the magnet and the current compensation amount according to the first and second embodiments of the present invention.
Figure 7:
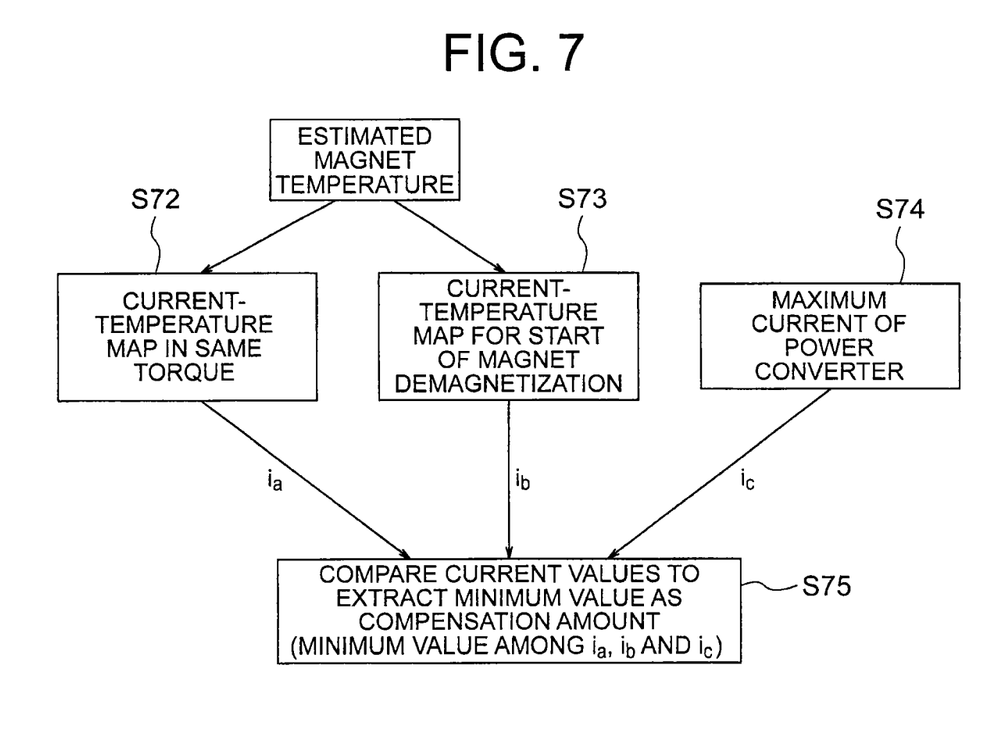
FIG. 7 is a flowchart illustrating a process flow of a method of calculating the current compensation amount from a temperature of the permanent magnet according to the first and second embodiments of the present invention.

Next, in Step S37, as illustrated in FIG. 7, based on the magnet temperature estimated in Step S36, the current compensator 18 calculates a current value is from a current-temperature curve in the same torque (see reference symbol 63 of FIGS. 6A to 6D) (Step S72), calculates a current value ib from a current-temperature curve for start of magnet demagnetization (see reference symbol 62 of FIGS. 6A to 6D) (Step S73), and calculates a current value is from the maximum current value of the power converter 2 (see reference symbol 61 of FIGS. 6A to 6D) (Step S74). Then, the current compensator 18 extracts the minimum (the smallest one) of the current values ia, ib, and ic, and sets the extracted value as the current compensation amount (Step S75). Note that, the current-temperature curve in the same torque and the current-temperature curve for start of magnet demagnetization are described below.

FIGS. 6A to 6D show relationships between the estimated magnet temperature (estimated temperature of the magnet) and the compensation amount for compensation by the current compensator 18. FIG. 6A and FIG. 6B show the cases of the high-temperature demagnetization magnet, while FIG. 6C and FIG. 6D show the cases of the low-temperature demagnetization magnet. In FIGS. 6A to 6D, the horizontal axis indicates the estimated magnet temperature (estimated temperature of the magnet), while the vertical axis indicates the compensation amount of the current compensator 18. In addition, the maximum current value of the power converter 2 is denoted by 61. The current compensator 18 stores data of the maximum current value (denoted by 61) of the power converter 2 in advance. In addition, a relationship between the magnet temperature of the permanent magnet when the permanent magnet starts demagnetization and the maximum current when the permanent magnet is demagnetized (hereinafter referred to as a current-temperature curve for start of magnet demagnetization) is denoted by 62. The current compensator 18 stores data of the current-temperature curve for start of magnet demagnetization (denoted by 62) in advance as a current-temperature map for start of magnet demagnetization. A relationship between the magnet temperature of the permanent magnet and the compensation amount in the same torque (hereinafter referred to as a current-temperature curve in the same torque) is denoted by 63. As shown by the current-temperature curve in the same torque (denoted by 63), the compensation amount of the current compensator 18 is determined by multiplying a temperature difference between the estimated temperature of the magnet and the reference temperature by an absolute value of a temperature coefficient of a residual magnetic flux density of the permanent magnet. The current compensator 18 stores the data of the current-temperature curve in the same torque (denoted by 63) in advance as a current-temperature compensation amount map. Note that, the compensation amounts shown in FIGS. 6A to 6D are ratios (%) to the current command value. For instance, if the compensation amount is 10%, the current compensator 18 outputs values of 10% of the current command values id and iq output by the current command generator 13.

It is preferred that ratios of the current command values id and iq of a target of compensation can be changed in accordance with a drive state so that the phase and the frequency can be changed.

The magnet temperature TL1 is set to the maximum temperature for performing torque compensation when using the high-temperature demagnetization magnet, at which the irreversible demagnetization does not occur to the magnet even when the compensation current is supplied. In addition, TL2 is the operable operating temperature limit of the motor including the high-temperature demagnetization magnet as the permanent magnet. TL3 is the operable operating temperature limit of the motor including the low-temperature demagnetization magnet as the permanent magnet.

With reference to FIG. 6A, the compensation amount when the high-temperature demagnetization magnet is used is described. FIG. 6A shows the largest current value of the power converter 2 (without dependence on the magnet temperature) (denoted by 61), the current-temperature curve for start of magnet demagnetization (denoted by 62), and the current-temperature curve in the same torque (denoted by 63). Here, FIG. 6A is a graph showing a case where the current-temperature curve for start of magnet demagnetization (denoted by 62) matches with the current-temperature curve in the same torque (denoted by 63) at TL1. First, if the estimated magnet temperature is lower than TL1, as shown by the current-temperature curve in the same torque (denoted by 63), the current compensation amount is calculated by multiplying a difference between the estimated temperature of the magnet and the reference temperature by the absolute value of the temperature coefficient of the residual magnetic flux density of the magnet. In addition, if the estimated magnet temperature is equal to or higher than TL1 and lower than TL2, the current-temperature curve in the same torque (denoted by 63) becomes larger than the current-temperature curve for start of magnet demagnetization (denoted by 62). Therefore, in order to protect the permanent magnet, the compensation amount of the current compensator 18 is decreased in accordance with the current-temperature curve for start of magnet demagnetization (denoted by 62). Therefore, as indicated by a thick line, if the estimated temperature of the magnet is lower than TL1, the current compensation amount is determined in accordance with the current-temperature curve in the same torque (denoted by 63). If the estimated temperature of the magnet is equal to or higher than TL1, the current compensation amount is determined in accordance with the current-temperature curve for start of magnet demagnetization (denoted by 62). Further, if the estimated temperature of the magnet is equal to or higher than TL2, in the same manner, a current amount may be compensated in accordance with the current-temperature curve for start of magnet demagnetization (denoted by 62).

Next, FIG. 6B shows a case where the torque is larger than that of FIG. 6A. Similarly to FIG. 6A, FIG. 6B shows the maximum current value of the power converter 2 (denoted by 61), the current-temperature curve for start of magnet demagnetization (denoted by 62), and the current-temperature curve in the same torque (denoted by 63). As shown in FIG. 6B, when the torque is large, in an area where the magnet temperature is lower than TL2, the current-temperature curve in the same torque (denoted by 63) reaches the maximum current value of the power converter 2 (denoted by 61) without demagnetization of the permanent magnet. In this case, it is necessary to set a motor current to be equal to or smaller than the maximum current value of the power converter 2 (denoted by 61). Therefore, as indicated by the thick line of FIG. 6B, in accordance with a value of the estimated temperature of the magnet, the current is compensated by a smallest value among the maximum current value of the power converter 2 (denoted by 61), the current-temperature curve for start of magnet demagnetization (denoted by 62), and the current-temperature curve in the same torque (denoted by 63).

In addition, in a case of a temperature lower than the reference temperature of 20° C., because the magnetic flux of the magnet becomes larger than that at the reference temperature, the current compensator 18 outputs a compensation amount to decrease the current command value so as to compensate for an increase of the torque.

In addition, with reference to FIG. 6C, the compensation amount when the low-temperature demagnetization magnet is used is described. When the low-temperature demagnetization magnet is used, if the estimated magnet temperature is equal to or higher than TL3, the current compensation amount is calculated by multiplying the difference between the estimated temperature of the magnet and the reference temperature by the absolute value of the temperature coefficient of the residual magnetic flux density of the magnet as shown by the current-temperature curve in the same torque (denoted by 63). In addition, also in FIG. 6C, similarly to FIG. 6A, the current-temperature curve for start of magnet demagnetization (denoted by 62) is shown together. Here, it is supposed that at the magnet temperature of TL3, a current for starting the magnet demagnetization is supplied. In this case, at a temperature equal to or lower than TL3, the current is compensated by using the current-temperature curve for start of magnet demagnetization (denoted by 62) in order to protect the permanent magnet from the irreversible demagnetization.

On the other hand, as shown in FIG. 6D, if a gradient of the current compensation amount is gentler than a gradient of the current-temperature curve for start of magnet demagnetization (denoted by 62), it indicates that the permanent magnet is less likely to be demagnetized. Therefore, as indicated by the current-temperature curve in the same torque (denoted by 63), the current compensation amount may be determined in accordance with the temperature coefficient of the residual magnetic flux density.

Next, in Step S38, the neutral detector 19 detects again whether or not the state is the neutral state. If the state is the neutral state, the process returns to Step S33. This operation is performed repeatedly until the time point $t_n$ at which the connection is made again by the clutch 6. By performing approximation of the estimated temperature of the magnet that is extracted, accuracy of the temperature estimation can be improved. When it is determined in Step S38 that the neutral state is not detected by the neutral detector 19 but it is detected that the clutch 6 has connected the wheel shaft to the driving power, the process proceeds to the next Step S39. In Step S39, the compensation amount extracted in Step S37 is output from the current compensator 18, and the current command values id and iq are compensated based on the compensation amount. Further, after processes in the current controller 14, the 2φ/3φ converter 15, and the PWM generator 16, the output is supplied to the power converter 2 so that the power converter 2 applies a voltage to the permanent magnet motor 1.

It is preferred that, if an interval between the time point $t_1$ and the time point $t_n$ is long, the estimated temperature of the magnet may be approximated only by a value extracted a few times before the time point $t_n$.

In addition, it is preferred to return from Step S38 to Step S33 after a certain extent of time elapses.

In the following, a method of determining the compensation amount is described with reference to specific examples.

First, a case of the high-temperature demagnetization magnet is described. It is supposed that the magnet temperature estimation is performed by driving the permanent magnet motor 1 using a neodymium magnet as the high-temperature demagnetization magnet. Because the operable operating temperature limit of the permanent magnet motor 1 is 180° C., the magnet temperature TL2 is set to 180° C. while TL1 is set to 100° C.

It is supposed that a magnet temperature estimated in a certain drive state is −10° C. Because a temperature difference between the estimated magnet temperature and a reference temperature of 20° C. is −30° C., when the temperature coefficient of the residual magnetic flux density of the neodymium magnet is −0.1 [%/K], it is determined that the magnetic flux density is increased by 3% based on multiplication between the temperature difference and the absolute value of the temperature coefficient. Therefore, the current compensator 18 compensates the output of the current command generator 13 by −3% so as to perform control ((−30)×|−0.1|=−3).

Similarly, if the estimated magnet temperature is 80° C., because the temperature difference between the estimated magnet temperature and the reference temperature of 20° C. is 60° C., the magnetic flux density is decreased by 6%. Therefore, the current compensator 18 compensates the output of the current command generator 13 by 6% so as to perform control (60=|−0.1|=6).

Further, if the estimated magnet temperature is 150° C., because the temperature difference between the estimated magnet temperature and the reference temperature of 20° C. is 130° C., the magnetic flux density is decreased by 13%. Therefore, the current compensator 18 compensates the output of the current command generator 13 by 13% so as to perform control. However, if the magnet temperature is equal to or higher than TL1 (100° C.) and lower than TL2 (180° C.), in order to protect the permanent magnet, the compensation amount of the current compensator 18 is decreased. Therefore, it is sufficient to perform compensation based on the case of 150° C. by using the current-temperature map for start of magnet demagnetization (denoted by 62). As to the current-temperature map for start of magnet demagnetization (denoted by 62), current-temperature relationships for start of magnet demagnetization in the cases where the magnet temperature is the reference temperature of 20° C., 100° C., and 180° C. are grasped in advance by a magnetic field analysis or an experiment, and the compensation by the current compensation amount is performed in accordance with the magnet temperature from the map.

On the other hand, if the estimated magnet temperature is 200° C., because the magnet temperature is equal to or higher than TL2 (180° C.), in order to protect the permanent magnet from the irreversible demagnetization, the output of the current command generator 13 is compensated in accordance with the current-temperature map for start of magnet demagnetization (denoted by 62). In addition, control may be performed to disconnect the current flowing in the permanent magnet motor 1. In addition, if the magnet temperature is equal to or higher than TL2 and the rotating speed is high, even if the supplied current amount is small, a non-load iron loss of the permanent magnet motor 1 itself is large. Therefore, the current command value id may be set to 0 so as to control the rotating speed not to be increased.

Next, a case of the low-temperature demagnetization magnet is described. It is supposed that the magnet temperature is estimated by driving the permanent magnet motor 1 using a ferrite magnet as the low-temperature demagnetization magnet. Because the operable operating temperature limit of the permanent magnet motor 1 is −40° C., the magnet temperature TL3 is set to −40° C.

It is supposed that the estimated magnet temperature in a certain drive is 50° C. Because the temperature difference between the estimated magnet temperature and the reference temperature of 20° C. is 30° C., when the temperature coefficient of the residual magnetic flux density of the ferrite magnet is −0.18 [%/K], the magnetic flux density is decreased by 5.4%. Therefore, the current compensator 18 compensates the output of the current command generator 13 by 5.4% so as to perform control (30×|−0.18|=5.4).

Similarly, if the estimated magnet temperature is 0° C., because the temperature difference between the estimated magnet temperature and the reference temperature of 20° C. is −20° C., the magnetic flux density is increased by 3.6%. Therefore, the current compensator 18 compensates the output of the current command generator 13 by −3.6% so as to perform control ((−20)×|−0.18|=−3.6).

If the estimated magnet temperature is −60° C., because the temperature difference between the estimated magnet temperature and the reference temperature of 20° C. is −80° C., the magnetic flux density is increased by 14.4%. Therefore, the current compensator 18 compensates the output of the current command generator 13 by −14.4% so as to perform control. However, as shown in FIG. 6C, if a gradient of the current-temperature map for start of magnet demagnetization (denoted by 62) is steeper than a gradient of the current compensation amount, the demagnetization occurs even if the current value is compensated by −14.4% so as to perform control. Therefore, in accordance with the current-temperature map for start of magnet demagnetization (denoted by 62), the control is performed so that the current compensation amount is further decreased. Note that, as shown in FIG. 6D, if the gradient of the current-temperature map for start of magnet demagnetization (denoted by 62) is gentler than the gradient of the current compensation amount, the current compensation amount may remain to be −14.4%.

It is preferred to provide a device for warming up the permanent magnet motor 1 by supplying such a very small current that a demagnetizing field does not occur for a long period of time when the magnet temperature becomes equal to or lower than TL3.

As described above, in the control device and the control method for a permanent magnet motor according to the first embodiment of the present invention, the rotating speed of the rotor of the permanent magnet motor 1, which is disconnected from the load by the clutch and rotating without power supply, is detected, and the magnet temperature of the permanent magnet motor 1 is estimated based on the detected rotating speed. Then, the compensation amount for compensating the current command to the permanent magnet motor 1 is determined based on the estimated magnet temperature, and the drive control device 11 controls the power converter 2 for controlling power supplied to the permanent magnet motor 1 based on the compensation amount. With this structure, the rotating speed of the rotor is measured in the state where the permanent magnet motor is disconnected from the load by the clutch so as to rotate without power supply, and hence the temperature of the permanent magnet can be estimated without being affected by inertia of a member other than the rotor or by the power supply state. Even if the magnetic flux of the permanent magnet changes due to a temperature variation, a torque variation and a decrease in efficiency can be suppressed.

In addition, in the control device and the control method for a permanent magnet motor according to the first embodiment of the present invention, the magnet temperature estimator 17 calculates the sum of the iron loss and the mechanical loss (iron loss+mechanical loss) based on the rotation gradient (decreasing degree) of the rotating speed in the predetermined time (Δt) and the inertia of the rotor, and estimates the magnet temperature by using the calculated value (iron loss+ mechanical loss) and the rotating speed and by referring to the first magnet temperature information (the relationship (map) among the sum of the iron loss and the mechanical loss, the rotating speed, and the magnet temperature, which is determined in advance). Therefore, the magnet temperature can be estimated only by the rotor position detector 7 without using an additional sensor or the like.

In addition, in the control device and the control method for a permanent magnet motor according to the first embodiment of the present invention, the current compensator 18 stores the map indicating the relationship between the magnet temperature and the compensation amount in advance, and extracts the compensation amounts for the current command values id and iq by referring to the map and the temperature estimated by the magnet temperature estimator 17. Therefore, it is possible to prevent the irreversible demagnetization of the permanent magnet due to a temperature variation.

Second Embodiment

Figure 8:
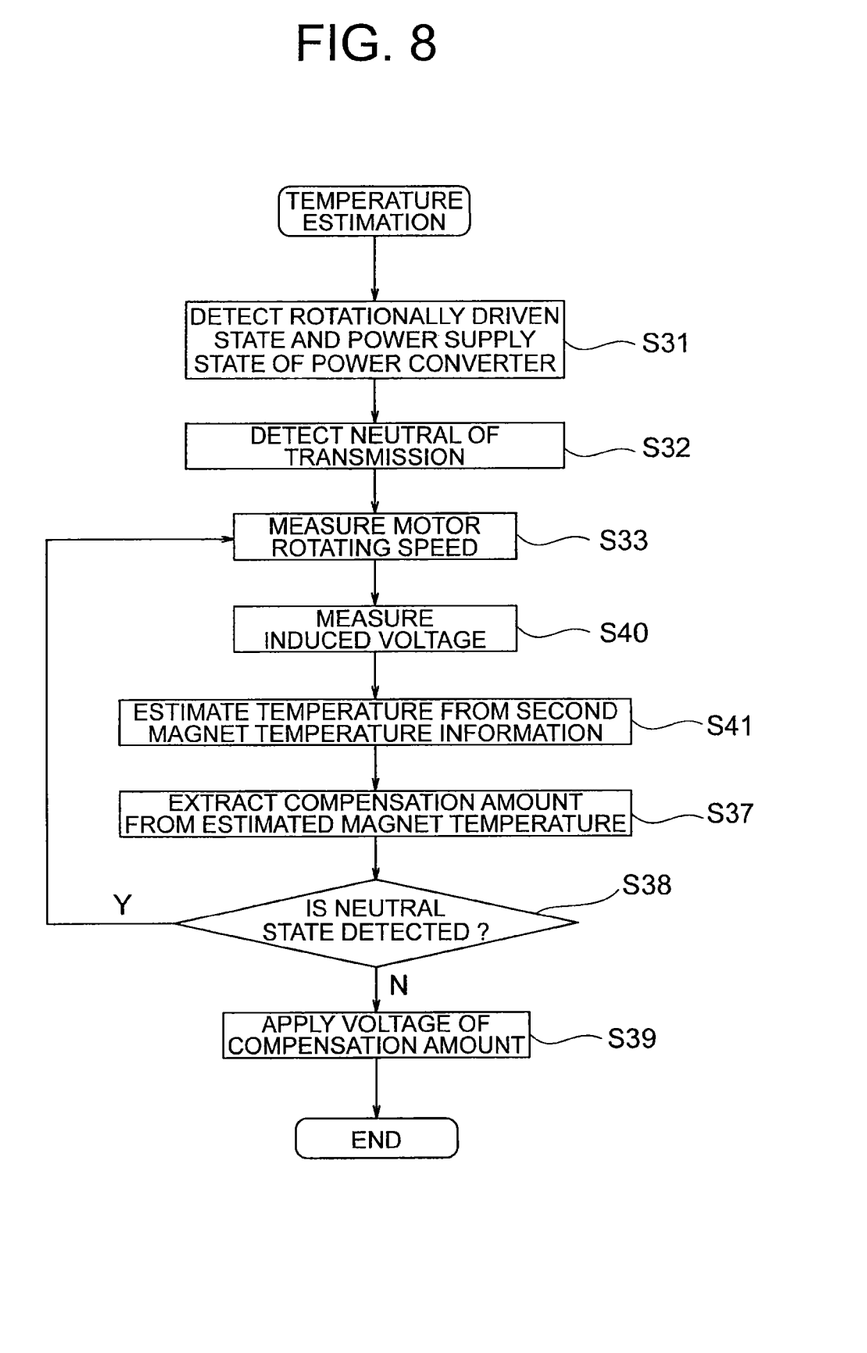
FIG. 8 is a flowchart illustrating a process flow of the control device and the control method for a permanent magnet motor according to the second embodiment of the present invention.

FIG. 8 is a flowchart of a controller used for a control device and a control method for a permanent magnet motor according to a second embodiment of the present invention. The method of estimating the magnet temperature of this embodiment is different from that of the first embodiment described above with reference to FIG. 3. In the first embodiment, the sum of the iron loss and the mechanical loss (iron loss plus mechanical loss) is determined based on the decreasing degree of the rotating speed of the motor in Δt seconds and the inertia of the rotor in Steps S34 and S35 of FIG. 3, and the temperature information is estimated by referring to the calculated sum of the iron loss and the mechanical loss and the first magnet temperature information in Step S36. In the second embodiment, instead of Steps S34 and S35 of FIG. 3, the power converter 2 measures an induced voltage between terminals of the permanent magnet motor 1 in Step S40 of FIG. 8. Instead of Step S36 of FIG. 3, the magnet temperature estimator 17 calculates an armature interlinkage magnetic flux from the rotating speed (angular velocity) of the permanent magnet motor 1 and the induced voltage between terminals thereof in Step S41 of FIG. 8. An armature interlinkage magnetic flux (pa is calculated by the following expression (2) when the induced voltage between terminals is represented by V, the number of pole pairs of the permanent magnet motor 1 is represented by Pn, and the rotating speed (angular velocity) measured in Step S33 is represented by ω1.

[Math. 2]

$$\phi_a = \frac{V}{P_n \omega_1} \quad (2)$$

Figure 9:
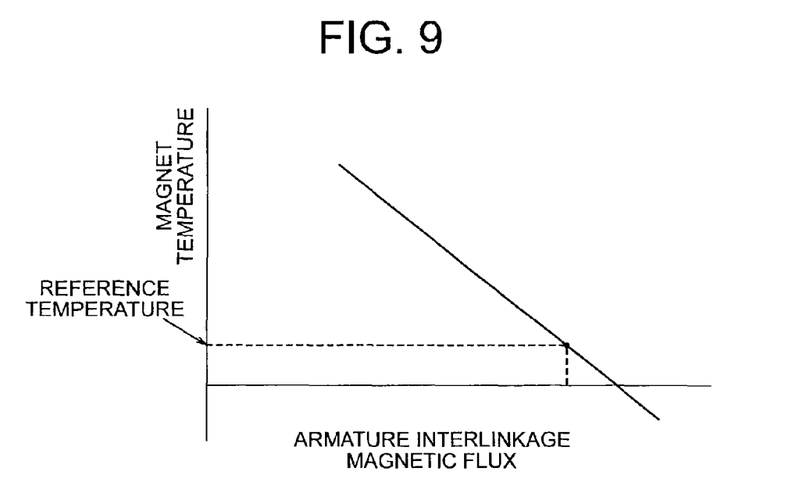
FIG. 9 is a graph showing a relationship between an armature interlinkage magnetic flux and a magnet temperature according to the second embodiment of the present invention.

The second embodiment is different from the first embodiment in that the magnet temperature is estimated by referring to the calculated armature interlinkage magnetic flux value, and a relationship between the armature interlinkage magnetic flux and the magnet temperature (hereinafter referred to as second magnet temperature information) determined in advance. Therefore, in the second embodiment, the relationship between the armature interlinkage magnetic flux and the magnet temperature (second magnet temperature information) is determined in advance and is stored as a second magnet temperature map in the magnet temperature estimator 17. FIG. 9 shows the second magnet temperature information (second magnet temperature map), in which the horizontal axis represents the armature interlinkage magnetic flux while the vertical axis represents the magnet temperature. FIG. 9 shows the relationship between the armature interlinkage magnetic flux and the magnet temperature. Other operations are the same as those in the first embodiment. Therefore, in the following description, the difference is mainly described. In addition, a structure of the control device for a permanent magnet motor according to the second embodiment is the same as that in the first embodiment described above with reference to FIG. 1, and therefore overlapping description is omitted with reference to FIG. 1.

In the second embodiment, as illustrated in FIG. 8, similarly to the first embodiment, the process of Steps S31 to S33 is first performed. In the second embodiment, next, the power converter 2 measures the induced voltage between terminals of the permanent magnet motor 1 (Step S40). Next, the armature interlinkage magnetic flux is calculated from the rotating speed measured in Step S33 and the induced voltage between terminals measured in Step S40 by using the above expression (2), so as to estimate the magnet temperature by referring to the second magnet temperature map stored in advance (Step S41). Using the estimated magnet temperature, similarly to the first embodiment, the process of Steps S37 to S39 is performed.

As described above, in the control device and the control method for a permanent magnet motor according to the second embodiment, similarly to the above-mentioned first embodiment, the rotating speed of the rotor of the permanent magnet motor 1, which is disconnected from the load by the clutch and rotating without power supply, is detected, and the magnet temperature of the permanent magnet motor 1 is estimated based on the detected rotating speed. Then, the compensation amount for compensating the current command to the permanent magnet motor 1 is determined based on the estimated magnet temperature, and the drive control device 11 controls the power converter 2 for controlling power supplied to the permanent magnet motor 1 based on the compensation amount. In this way, the rotating speed of the rotor is measured in the state where the permanent magnet motor is disconnected from the load by the clutch so as to rotate without power supply, and hence the temperature of the permanent magnet can be estimated without being affected by inertia of a member other than the rotor or by the power supply state. Even if the magnetic flux of the permanent magnet whose temperature has been estimated changes due to a temperature variation, a torque variation and a decrease in efficiency can be suppressed.

In addition, in the control device and the control method for a permanent magnet motor according to the second embodiment, the magnet temperature estimator 17 calculates the armature interlinkage magnetic flux from the measured rotating speed and induced voltage between terminals, and estimates the magnet temperature by referring to the second magnet temperature map. Therefore, the magnet temperature can be estimated without using a complicated calculation.

In addition, also in the control device and the control method for a permanent magnet motor according to the second embodiment, similarly to the above-mentioned first embodiment, the current compensator 18 stores the temperature-compensation amount map indicating the relationship between the magnet temperature and the compensation amount in advance, and extracts the compensation amounts for the current command values id and iq by using the temperature estimated by the magnet temperature estimator 17 and by referring to the temperature-compensation amount map. Therefore, it is possible to prevent the irreversible demagnetization of the permanent magnet due to a temperature variation.

Third Embodiment

Figure 10:
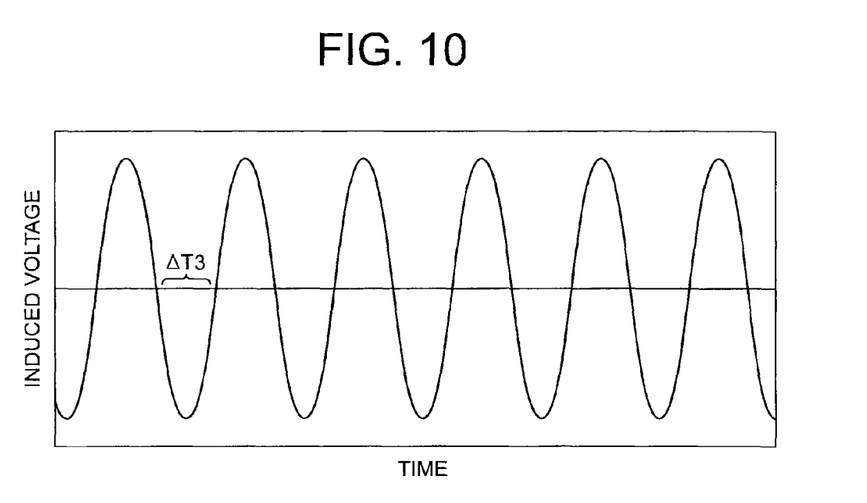
FIG. 10 is a graph for describing a zero cross of an induced voltage according to a third embodiment of the present invention.

In the first and second embodiments, there are described examples in which an existing device such as a resolver or an encoder is used as the rotor position detector 7. However, it is possible to detect the rotor position by calculation based on the induced voltage between terminals of the permanent magnet motor 1. The induced voltage between terminals of the permanent magnet motor 1 is used in the second embodiment. When measuring a zero cross interval $\Delta T3$ of the induced voltage (see FIG. 10), one cycle of an electrical angle of the permanent magnet motor 1 can be determined as $2 \times \Delta T3$. Therefore, a rotation speed R [r/min] of the permanent magnet motor 1 can be expressed by $R=60/(Pn \times 2 \times \Delta T3)$ using the number of pole pairs Pn of the permanent magnet motor 1 and $\Delta T3$. In this way, the rotating speed can be easily measured. In addition, when both the detection using the rotor position detector 7 and the measurement of the zero cross of the induced voltage are provided, it is possible to detect a failure of the rotor position detector 7, a short circuit of the winding of the induced voltage, and the like.

REFERENCE SIGNS LIST 1 permanent magnet motor, 2 power converter, 3 capacitor, 4 DC power supply, 5 transmission, 6 clutch, 7 rotor position detector, 8 current detector, 11 drive control device, 12 3φ/2φ converter, 13 current command generator, 14 current controller, 15 2φ/3φ converter, 16 PWM generator, 17 magnet temperature estimator, 18 current compensator, 19 neutral detector.

The invention claimed is:

1. A control device for a permanent magnet motor, comprising:
   a rotor position detector configured to detect a rotating speed of a rotor of a permanent magnet motor in a state in which the permanent magnet motor is disconnected from a load by a clutch and rotates without power supply;
   a magnet temperature estimator configured to estimate a magnet temperature of the permanent magnet motor based on the detected rotating speed;
   a current compensator configured to determine a compensation amount for compensating a current command to the permanent magnet motor based on the estimated magnet temperature; and
   a drive control device configured to control a power converter for driving the permanent magnet motor based on the compensation amount,
   wherein the magnet temperature estimator is configured to:
   store in advance a second magnet temperature map determined as a map of second magnet temperature information indicating a relationship between an armature interlinkage magnetic flux of the permanent magnet motor and the magnet temperature of the permanent magnet motor;
   calculate the armature interlinkage magnetic flux based on the rotating speed detected by the rotor position detector and an induced voltage between terminals of the permanent magnet motor detected by the power converter; and
   estimate the magnet temperature of the permanent magnet motor based on the calculated armature interlinkage magnetic flux and the second magnet temperature map.

2. A control device for a permanent magnet motor according to claim 1, wherein the current compensator is configured to:
   store in advance:
      a current-temperature compensation amount map indicating a relationship between the magnet temperature of the permanent magnet motor and the compensation amount for compensating the current command in the same torque;
      a maximum current value of the power converter; and
      a current-temperature map for start of magnet demagnetization indicating a relationship between the magnet temperature of the permanent magnet motor when the permanent magnet starts demagnetization and a maximum current when the permanent magnet is demagnetized; and
   determine the compensation amount by referring to a smallest value among the value extracted from the current-temperature compensation amount map, the maximum current value of the power converter, and the value extracted from the current-temperature map for start of magnet demagnetization by using the magnet temperature estimated by the magnet temperature estimator.

3. A control device for a permanent magnet motor, comprising:
  a rotor position detector configured to detect a rotating speed of a rotor of a permanent magnet motor in a state in which the permanent magnet motor is disconnected from a load by a clutch and rotates without power supply;
  a magnet temperature estimator configured to estimate a magnet temperature of the permanent magnet motor based on the detected rotating speed;
  a current compensator configured to determine a compensation amount for compensating a current command to the permanent magnet motor based on the estimated magnet temperature; and
  a drive control device configured to control a power converter for driving the permanent magnet motor based on the compensation amount,
  wherein the magnet temperature estimator is configured to:
  store in advance a first magnet temperature map determined as a map of first magnet temperature information indicating a relationship among the rotating speed of the rotor, a sum of an iron loss and a mechanical loss of the rotor, and the magnet temperature of the permanent magnet motor;
  calculate the sum of the iron loss and the mechanical loss based on a rotation gradient of the rotating speed detected by the rotor position detector and inertia of the rotor; and
  estimate the magnet temperature of the permanent magnet motor by referring to the first magnet temperature map based on the calculated sum of the iron loss and the mechanical loss and the detected rotating speed.

4. A control device for a permanent magnet motor according to claim 3, wherein the current compensator is configured to:
  store in advance:
    a current-temperature compensation amount map indicating a relationship between the magnet temperature of the permanent magnet motor and the compensation amount for compensating the current command in the same torque;
    a maximum current value of the power converter; and
    a current-temperature map for start of magnet demagnetization indicating a relationship between the magnet temperature of the permanent magnet motor when the permanent magnet starts demagnetization and a maximum current when the permanent magnet is demagnetized; and
  determine the compensation amount by referring to a smallest value among the value extracted from the current-temperature compensation amount map, the maximum current value of the power converter, and the value extracted from the current-temperature map for start of magnet demagnetization by using the magnet temperature estimated by the magnet temperature estimator.

5. A control method for a permanent magnet motor, the permanent magnet motor being rotatable without power supply when disconnected from a load by a clutch,
  the control method comprising:
  detecting rotation of the permanent magnet motor;
  detecting a power supply state to the permanent magnet motor;
  measuring a rotating speed of the permanent magnet motor when it is detected that the permanent magnet motor is rotating without power supply;
  estimating a magnet temperature of the permanent magnet motor based on the measured rotating speed;
  extracting a compensation amount for compensating a current command to the permanent magnet motor based on the estimated magnet temperature; and
  controlling a power converter for driving the permanent magnet motor based on the compensation amount,
  wherein the estimating the magnet temperature comprises:
  storing in advance a second magnet temperature map determined as a map of second magnet temperature information indicating a relationship between an armature interlinkage magnetic flux of the permanent magnet motor and the magnet temperature of the permanent magnet motor;
  calculating the armature interlinkage magnetic flux based on the rotating speed detected by the rotor position detector and a voltage between terminals of the permanent magnet motor detected by the power converter; and
  estimating the magnet temperature of the permanent magnet motor based on the calculated armature interlinkage magnetic flux and the second magnet temperature map.

6. A control method for a permanent magnet motor according to claim 5, wherein the extracting the compensation amount comprises:
  storing in advance:
    a current-temperature compensation amount map indicating a relationship between the magnet temperature of the permanent magnet motor and the compensation amount for compensating the current command in the same torque;
    a maximum current value of the power converter; and
    a current-temperature map for start of magnet demagnetization indicating a relationship between the magnet temperature of the permanent magnet motor when the permanent magnet starts demagnetization and a maximum current when the permanent magnet is demagnetized; and
  determining the compensation amount by referring to a smallest value among the value extracted from the current-temperature compensation amount map, the maximum current value of the power converter, and the value extracted from the current-temperature map for start of magnet demagnetization by using the magnet temperature estimated in the estimating the magnet temperature.

* * * * *